(12) United States Patent
Evenden et al.

(10) Patent No.: US 9,338,185 B2
(45) Date of Patent: May 10, 2016

(54) SERVICE PROVISION

(75) Inventors: Richard J Evenden, Ipswich (GB);
Francis J Scahill, Ipswich (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 149 days.

(21) Appl. No.: 13/147,305

(22) PCT Filed: Feb. 1, 2010

(86) PCT No.: PCT/GB2010/000162
§ 371 (c)(1),
(2), (4) Date: Aug. 1, 2011

(87) PCT Pub. No.: WO2010/086624
PCT Pub. Date: Aug. 5, 2010

(65) Prior Publication Data
US 2011/0289563 A1    Nov. 24, 2011

(30) Foreign Application Priority Data

Jan. 30, 2009  (EP) .................................. 09250249
Jan. 30, 2009  (GB) .................................. 0901585.0

(51) Int. Cl.
*H04L 9/32* (2006.01)
*H04L 29/06* (2006.01)
(Continued)

(52) U.S. Cl.
CPC ........ *H04L 63/1466* (2013.01); *H04L 63/0823* (2013.01); *H04L 63/1483* (2013.01); *H04L 67/02* (2013.01); *H04L 63/0853* (2013.01); *H04W 12/06* (2013.01)

(58) Field of Classification Search
CPC ....... H04L 63/08; H04L 63/10; H04L 63/083; H04L 63/102; H04L 63/0428; H04L 63/105; H04L 63/0853; H04L 63/0823; H04L 63/20; H04L 63/0815; H04W 12/06; H04W 12/08
USPC .......................................................... 726/2–7
See application file for complete search history.

(56) References Cited

U.S. PATENT DOCUMENTS 6,865,735 B1 *  3/2005  Sirer et al. .................... 717/158
2004/0083366 A1  4/2004  Nachenberg et al.
(Continued)

FOREIGN PATENT DOCUMENTS

EP    1 903 741    3/2008
EP    1 962 220    8/2008
(Continued)

OTHER PUBLICATIONS

International Search Report for PCT/GB2010/000162, mailed May 18, 2010.
(Continued)

*Primary Examiner* — Alexander Lagor
(74) *Attorney, Agent, or Firm* — Nixon & Vanderhye PC

(57) ABSTRACT

A method and system for service provision, comprising: a web browser (4) in a first communications device (e.g. a personal computer) (2) running a script (8) that is from a remote source (e.g. a remote web server) (30); sending, from the first communications device (2) to a second communications device (e.g. a smart phone) (16), a service request for a service required by the script (8) running on the web browser (4); sending a user authorization request from the second communications device (16) to the first communications device (2); the first communications device (2) obtaining authorization from a user (12); sending a user authorization from the first communications device (2) to the second communications device (16); and the second communications device (16) providing the requested service only if the user authorization is received.

7 Claims, 9 Drawing Sheets

(51) Int. Cl.
H04L 29/08 (2006.01)
H04W 12/06 (2009.01)

(56) References Cited

U.S. PATENT DOCUMENTS

| | | | |
|---|---|---|---|
| 2004/0260754 | A1 | 12/2004 | Olson et al. |
| 2005/0055581 | A1* | 3/2005 | Larsen .................. 713/202 |
| 2006/0225137 | A1 | 10/2006 | Odins-Lucas et al. |
| 2006/0235795 | A1* | 10/2006 | Johnson et al. .......... 705/44 |
| 2006/0281542 | A1 | 12/2006 | Aird et al. |
| 2006/0294102 | A1 | 12/2006 | Reddish et al. |
| 2007/0079361 | A1 | 4/2007 | Hays et al. |
| 2007/0107057 | A1 | 5/2007 | Chander et al. |
| 2007/0118878 | A1* | 5/2007 | Sastry et al. ................ 726/3 |
| 2008/0222299 | A1 | 9/2008 | Boodaei |
| 2008/0320567 | A1 | 12/2008 | Shulman et al. |

FOREIGN PATENT DOCUMENTS

| | | |
|---|---|---|
| EP | 1 986 395 | 10/2008 |
| WO | WO 03/019415 | 3/2003 |
| WO | 03/098563 | 11/2003 |
| WO | 2006/048149 | 5/2006 |

OTHER PUBLICATIONS

Nenad Jovanovic et al., "Preventing Cross Site Request Forgery Attacks", Securecom and Workshops, (Aug. 1, 2006), pp. 1-10.

"Windows Script Host: New Code-Signing Features Protect Against Malicious Scripts", Microsoft Article, 2013 Microsoft Corporation (6 pgs.).

Jovanovic, Nenad et al., "Preventing Cross Site Request Forgery Attacks", Secure Systems Lab, Technical University of Vienna, 2006 IEEE (10 pgs.).

Kerschbaum, Florian, "Simple Cross-Site Attack Prevention", SAP Research Karlsruhe, Germany, date unknown (10 pgs.).

Kirda, Engin et al., "Noxes: A Client-Side Solution for Mitigating Cross-Site Scripting Attacks", Technical University or Vienna and University of California, Santa Barbara, *SAC '06* Apr. 23-27, 2006. Dijon, France (8 pgs).

NoScript Article "Inform Action Open Source Software", retrieved from http://web.archive.org/web/20071011014133/http://noscript.net/features, on May 5, 2009, © 2004-2007 InformAction.

Office Action (14 pgs.) dated Mar. 14, 2013 issued in co-pending U.S. Appl. No. 13/147,312.

International Search Report for PCT/GB2010/000164 mailed May 17, 2010.

\* cited by examiner

SERVICE PROVISION

This application is the U.S. national phase of International Application No. PCT/GB2010/000162 filed 1 Feb. 2010, which designated the U.S. and claims priority to EP Application No. 09250249.1 filed 30 Jan. 2009; and GB Application No. 0901585.0 filed 30 Jan. 2009, the entire contents of each of which are hereby incorporated by reference.

BACKGROUND AND SUMMARY

The present invention relates to service provision. The present invention relates in particular, but not exclusively, to service provision between web browsers and web servers where the web server is provided on a mobile device such as a smartphone.

A web browser operates to enable display of, and user interaction with, information provided by a web server. Typically the web browser and web server are connected via the internet and/or other networks such as a local area network. Typically the web browser is an application operating as part of user equipment such as a personal computer, and the web server is located remotely under the control of a separate party and provides a website. One example of a web browser is "Internet Explorer" (trademark) provided by Microsoft (trademark).

Web browsers may be implemented as software. So-called web browser plug-ins may be added to, or operated by, an existing web browser to provide additional functionality to the web browser. Web servers are also implemented in some mobile devices, such as for example smartphones.

Normally web browsers only make it possible for a web application sourced from a site to communicate with the web site from which the application originated. However various methods exist that allow web applications to communicate with multiple web sites. These methods include loading images from other web sites, and sourcing <script> tags from the other web sites. Some web applications use cross-site scripting occurs to offer services that cannot be offered in the usual way and can therefore offer useful and novel services to users. For example, we have developed web services that run on smartphones (such as the iPhone, and similar Blackberry and Nokia products) which offer web server functionality, the web services providing access to mobile device-held content, such as contacts, call log, sms messages and location information (GPS info, cell info, wifi access point info, etc.) and which may also allow the initiation of actions such as initiating calls, sending SMS messages, etc. The present invention has especial application to such web services. In particular it is contemplated that an API be published relating to such services, so that internet site authors know in advance that such services from such phones are possible, and so code authored websites to the published API. Our system provides a UPnP-based discovery mechanism to alert the browser of a first device (a computer, such as a laptop, or an IP router, Desktop computer, network storage device, etc.) that a compatible phone has been physically connected to the LAN (or is within close proximity where the first device and the phone can communicate wirelessly) so that the website can then start the authentication process.

Allowing cross site scripting does however open up a number of security risks. Indeed it has been reported that the well-known computing and Internet security company Symantec found that in 2007 cross site scripting vulnerabilities accounted for some 80% of all the security vulnerabilities found.

Security processes for access between plural entities are known, for example as disclosed in EP 1 903 741 (A1), WO 03098563 (A2) and IE 20020438 (A2).

Known security processes do not however alleviate risks presented to a device (e.g. a mobile device) with a web server when accessed by a web browser that is involved in cross-site scripting from web servers other than the device's web server or other operations involving plural web servers other than the device's web server. So the aforementioned web services which we have developed which rely on cross site scripting to, for example, a smart phone, will preferably be provided with some security mechanism(s) to reduce the threat posed by cross site scripting attacks.

The present invention seeks to address this problem.

In a first aspect the present invention provides a method of service provision, comprising: a web browser, running in a first communications device, running a script that is from a remote source; sending, from the first communications device to a second communications device, a service request for a service required by the script running on the web browser; sending a user authorisation request from the second communications device to the first communications device; the first communications device obtaining authorisation from a user of the first communications device; sending a user authorisation from the first communications device to the second communications device; and the second communications device providing the requested service only if the user authorisation is received.

In a further aspect the present invention provides a method for a first communications device to request a service from a second communications device; comprising: a web browser, running in a first communications device, running a script that is from a remote source; the first communications device sending, to a second communications device, a service request for a service required by the script running on the web browser; the first communications device receiving a user authorisation request from the second communications device; the first communications device obtaining authorisation from a user of the first communications device; and the first communications device sending a user authorisation to the second communications device.

In a further aspect the present invention provides a method for a second communications device to respond to a service request from a first communications device, comprising: the second communications device receiving, from the first communications device, a service request for a service required by script running on a web browser running in the first communications device; the second communications device sending a user authorisation request to the first communications device; the second communications device receiving a user authorisation from the first communications device; and the second communications device providing the requested service only if the user authorisation is received.

The second communications device may determine whether user authorisation is required for the service; and the user authorisation request may be sent from the second communications device to the first communications device only if the second communications device determines that user authorisation is required for the service.

The user authorisation may comprise an approval of the service request encrypted with a password known to the first communications device and the second communications device.

The remote source may be a remote web server.

A web server running in the second communications device may receive the service request and the user authorisation.

If the second communications device performs the requested service, a service product may be produced which is forwarded to the first communications device.

The second communications device may be a smartphone.

In a further aspect the present invention provides a storage medium storing processor-implementable instructions for controlling one or more processors to carry out any of the above aspects.

In a further aspect the present invention provides a service provision system, comprising a first communications device and a second communications device; the first communications device being adapted to run, on a web browser running in the first communications device, a script that is from a remote source; the first communications device further being adapted to send, to the second communications device, a service request for a service required by the script running on the web browser; the second communications device being adapted to send a user authorisation request to the first communications device; the first communications device further being adapted to obtain authorisation from a user of the first communications device; the first communications device further being adapted to send a user authorisation to the second communications device; and the second communications device further being adapted to provide the requested service only if the user authorisation is received.

In a further aspect the present invention provides a first communications device for requesting a service from a second communications device, the first communications device comprising: a web browser adapted to run a script that is from a remote source; wherein: the first communications device is adapted to send, to the second communications device, a service request for a service required by the script running on the web browser; the first communications device is further adapted to receive a user authorisation request from the second communications device; the first communications device is further adapted to obtain authorisation from a user of the first communications device; and the first communications device is further adapted to send a user authorisation to the second communications device.

In a further aspect the present invention provides a second communications device for responding to a service request from a first communications device; the second communications device being adapted to receive, from the first communications device, a service request for a service required by a script running on a web browser running in the first communications device; the second communications device further being adapted to send a user authorisation request to the first communications device; the second communications device further being adapted to receive a user authorisation from the first communications device; and the second communications device further being adapted to provide the requested service only if the user authorisation is received.

The second communication device may be further adapted to determine whether user authorisation is required for the service; and the user authorisation request may be sent from the second communications device to the first communications device only if the second communication device determines that user authorisation is required for the service.

The user authorisation may comprise an approval of the service request encrypted with a password known to the first communications device and the second communications device.

The remote source may be a remote web server.

A web server running in the second communications device may be adapted to receive the service request and the user authorisation.

The second communications device may be further adapted to produce a service product if the second communications device performs the requested service, and may be further adapted to forward the service product to the first communications device.

The second communications device may be a smartphone.

In a preferred embodiment the invention is configured to allow a user of a device such a computer (e.g. a laptop) to grant access from internet web sites browsed on the computer to web services provided by a mobile device (such a smartphone). The computer hosts a browser which is provided with a security module (such as a plug-in or browser helper object). The mobile device is where the service resides and is where the security verification is applied. The mobile device is not authenticating access to the Internet web sites. Using a means of secure access, such as a username and password, known to the user and the mobile but not known to the PC browser applications (other than the secure plug-in). Typically, the interface to the mobile device will be provided by HTTP it is preferable to add user authentication and application identity verification information to each web request. This is the purpose of the plug-in which is to verify the application i.d. (i.e the actual referrer url—that is the URL of the site from which comes the script which is seeking access to a service offered by the mobile device), provide the GUI to the user to gain the username and password, interact with the mobile server to obtain dynamic information (nonce, request count)) and calculate the appropriate authentication information. The plug-in and mobile share a private key so that they can mutually authenticate each other as real plug-in and real server.

BRIEF DESCRIPTION OF THE DRAWINGS

Embodiments of the invention will now be described, by way of example only, with reference to the accompanying drawings, in which.

DETAILED DESCRIPTION OF PRESENT EXAMPLE EMBODIMENTS

Figure 1:
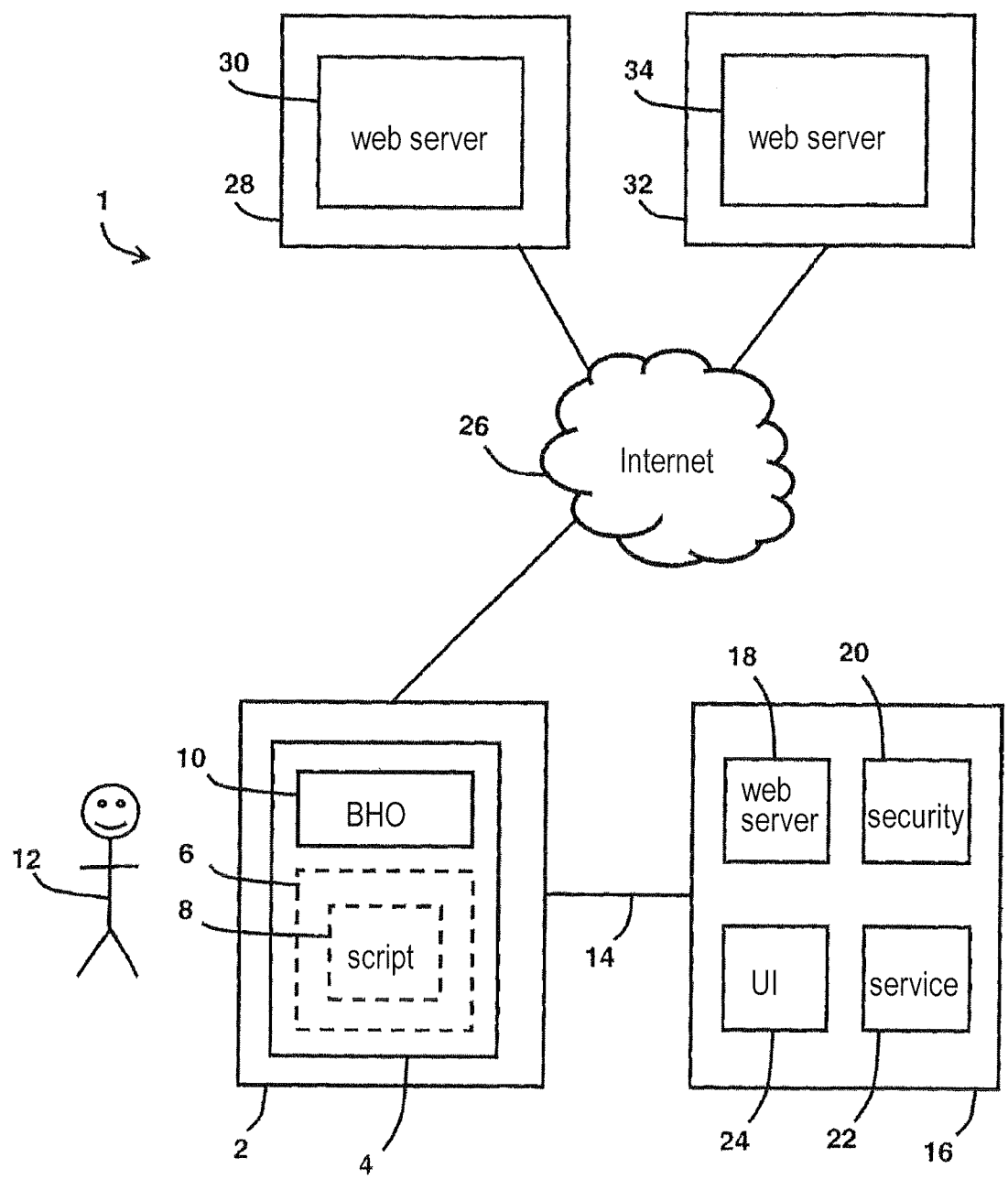
FIG. 1 is a block diagram schematically showing a communications network in which a first embodiment of the invention is implemented.

FIG. 1 is a block diagram schematically showing a communications network 1 in which a first embodiment of the invention is implemented. The communications network 1 comprises a first server 28, a second server 32, the Internet 26, a personal computer (PC) 2, —which could of course be an Apple or other computer not based on the PC standard, a user 12 of the computer 2, and a smartphone 16.

A first web server 30 is operated by the first server 28, i.e. the first web server 30 is an application implemented by the first server 28, in conventional fashion. The first web server 30 is regarded by the user 12 as being trustworthy, i.e. not to comprise malicious or harmful content, or the first web server 30 hosts a website that the user trusts. Thus, the first web server 30 is hereinafter referred to as the trusted web server 30. Also, the first server 28 is hereinafter referred to as the trusted server 28.

A second web server 34 is operated by the second server 32, i.e. the second web server 34 is an application implemented by the second server 32, in conventional fashion. The second web server 34 is not regarded by the user 12 as being trustworthy, e.g. the second web server or websites hosted by it may not be known to the user. Thus, the second web server 34 is hereinafter referred to as the untrusted web server 34. Also, the second server 32 is hereinafter referred to as the untrusted server 32.

The PC 2 is connected to the smartphone 16 via a Wi-Fi link 14. The PC 2 is connected to the trusted server 28 via the internet 26. The PC 2 is connected to the untrusted server 32 via the internet 26. For convenience all the above described connections are shown in FIG. 1 as implemented at the same time. However, as will be appreciated from details below, the connections are not necessarily all present at the same time.

The PC 2 is operated by the user 12. A web browser 4 is operated by the PC 2, i.e. the web browser 4 is an application implemented by the PC 2. This is implemented in conventional fashion except where described otherwise below.

The web browser 4 comprises a browser helper object (BHO) 10. In this embodiment the browser helper object 10 is provided as a web browser plug-in application that has been added to an existing web browser application to provide additional functionality as described below. The browser helper object runs in a trusted environment (i.e. the web browser 4) and is itself trusted by the user.

In FIG. 1 the web browser 4 is shown comprising trusted content 6 that is downloaded from the trusted server 28 during an example of an authentication process detailed below with reference to FIGS. 2 to 4. The content that is downloaded from the trusted server 28 is referred to here as trusted content 6 because the server the content is received from is trusted by the user 12, as described above.

In FIG. 1 the trusted content 6 from the trusted server 28 is shown to comprise trusted client side script 8 that is implemented by the web browser 4 during the example of the authentication process detailed below with reference to FIGS. 2 to 4. The client side script is referred to here as trusted client side script 8 because the content that comprises the client side script is received from a server that is trusted by the user 12, as described above. In this example the trusted client side script 8 is JavaScript (trademark).

The smartphone 16 is a conventional smartphone except where described otherwise below. In particular, the smartphone 16 is a mobile telephone whose operating system allows third party applications to run on it. As such the smartphone 16 can be considered as comprising a plurality of functional modules in addition to those used for conventional mobile telephone functions. The following particular functional modules comprised by the smartphone 16 are useful for understanding this example: a mobile web server 18, a security module 20, a service module 22, and a user interface 24.

The mobile web server 18 is operated by the smartphone 16, i.e. the mobile web server 18 is an application implemented by the smartphone 16. This is implemented in conventional fashion except where described otherwise below. The mobile web server 18 processes requests and other communications received by the smartphone 16, e.g. from the PC 2 via the Wi-Fi link 14. In performing this processing role, the mobile web server 18 may call upon one or more of the security module 20, the service module 22, and the user interface 24, as required, and as described in more detail below.

The security module 20 performs security processes when requested to do so by e.g. the mobile web server 18. An example of such a security process is generating a "number used once" (nonce) in response to a nonce request.

The service module 22 performs service processes when requested to do so by e.g. the mobile web server 18. An example of such a service process is providing user contacts details stored on the smartphone 16.

The user interface 24 comprises a display screen and a standard smartphone key-pad.

Figure 2:
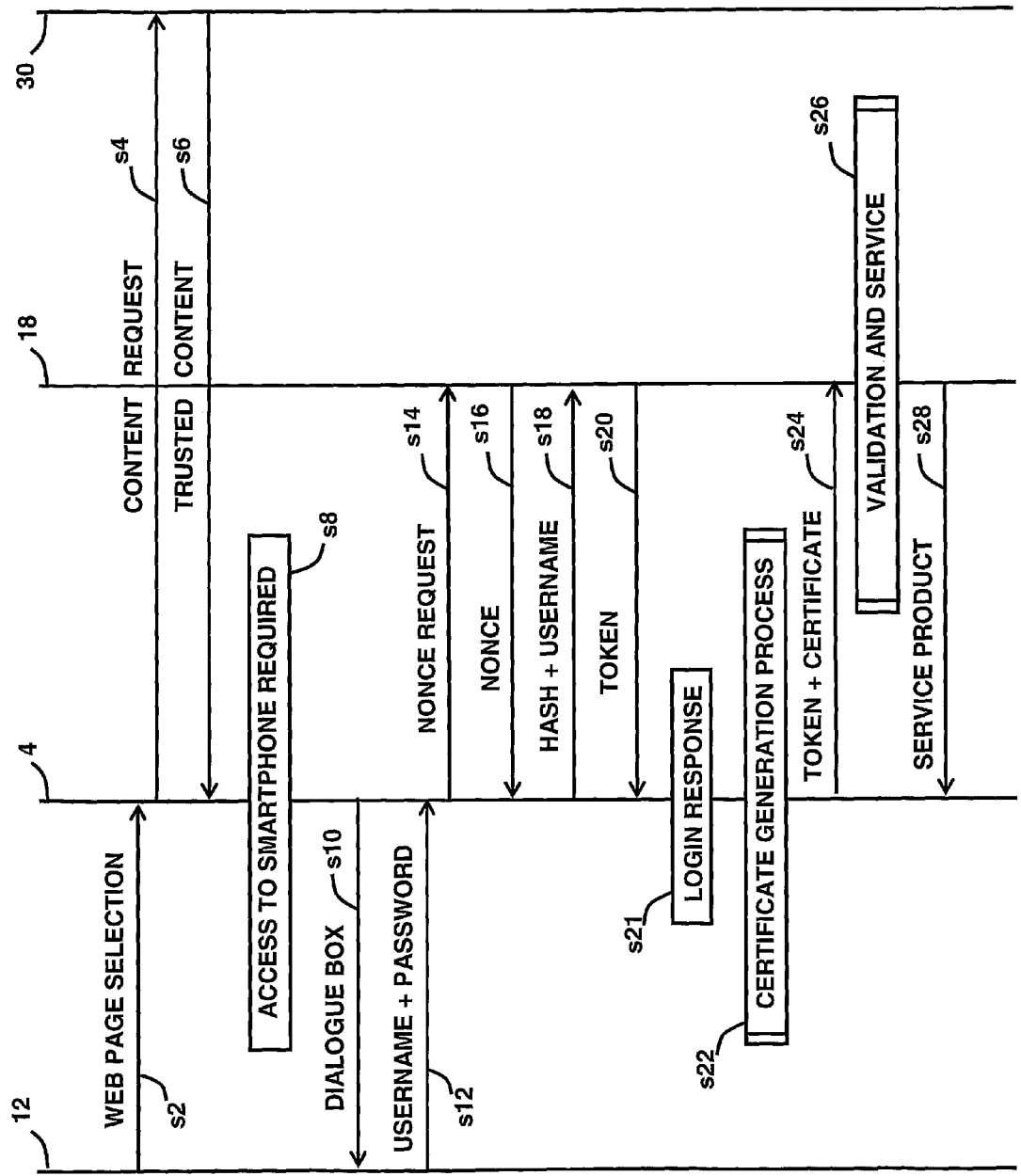
FIG. 2 is a hybrid message sequence chart and process flowchart showing certain messages and steps involved in an example of an authentication process implemented in the communications network.

FIG. 2 is a hybrid message sequence chart and process flowchart showing certain messages and steps involved in an example of an authentication process implemented in the communications network 1 that is useful for understanding the later described embodiment. The following entities are shown: the user 12, the web browser 4, the mobile web server 18 and the trusted web server 30.

In this example a first precondition has been fulfilled by the above entities before the start of the process. The first precondition is that the user 12 is registered to use the smartphone 16 e.g. by way of a username and password shared between the user 12 and the smartphone 16. The username and the password are stored in the security module 20 of the smartphone 16. Thereafter, the user 12, on verifying his or her identity by means of the username and the password, is allowed to access and implement services on the smartphone 16, e.g. those stored in the service module 22.

At step s2, the user 12 selects, and enters into the web browser 4 of the PC 2, the URL of a first website, the first website being a website hosted by the trusted web server 30.

At step s4, the web browser 4 sends a content request, hereinafter referred to as the "first content request", to the trusted web server 30. The first content request is in the form of an HTTP request specifying the selected URL.

At step s6, the trusted web server 30 sends a response, hereinafter referred to as the "first response" to the web browser 4. The first response comprises the trusted content 6 previously described with reference to FIG. 1. The trusted content 6 is a HTTP response in the form of a HTML document corresponding to the website of the selected URL.

At step s8, the web browser 4 determines that access to the smartphone 16 will be required. This is carried out as follows.

The web browser 4 processes the first response by running the trusted content 6. The trusted content 6 comprises the trusted client side script 8 as described above with reference to FIG. 1. Thus, the trusted client side script 8 is run by the web browser 4.

The trusted client side script 8 comprises code that calls on services offered by the service module 22 of the smartphone 16, and code that instructs the web browser 4 to log-in to the smartphone 16. Thus, the process of running the trusted client side script 8 determines that the web browser 4 is required to log-in to the smartphone 16. The web browser 4 is required to log-in to the smartphone 16 by the trusted client side script 8 because the trusted client side script 8 requires that a service request, hereinafter referred to as the "first service request", be issued by the web browser 4 to the smartphone 16. The first service request requests the performance of a service process by the service module 22 of the smartphone 16.

A login request, hereinafter referred to as the "first login request", is issued by the trusted client side script 8 to the browser helper object 10. The first login request is a communication indicating to the browser helper object 10 the requirement of the trusted client side script 8 that the web browser 4 becomes logged in to the smartphone 16.

At step s10, the first login request is communicated to the user 12. In this example, the login request is communicated to the user 12 by means of a dialogue box displayed by the PC 2. The dialogue box requires that the username and the password be input by the user 12. The dialogue box displays the identity of the smartphone 16 and an indication of the origin of the trusted client side script 8 (i.e. the trusted web server 30).

At step s12, the user 12 enters the username and the password into the dialogue box and this is input into the web browser 4.

At step s14, a nonce request is issued by the web browser 4 and sent to the mobile web server 18. The nonce request comprises the username, a statement of origin, hereinafter referred to as the "first statement of origin", i.e. a statement that the origin of the trusted client side script 8 is the trusted web server 30, and a request that a nonce is issued to the web browser 4 by the smartphone 16.

The nonce request is passed from the mobile web server 18 to the security module 20. The security module 20 generates a nonce. The nonce comprises a nonce value, and an encryption algorithm. The security module 20 retains a copy of the generated nonce, and also the details of the nonce request. The security module 20 also passes the nonce to the mobile web server 18. At step s16, the mobile web server 18 forwards the nonce to the web browser 4 as the response to the received nonce request.

The web browser 4 receives the nonce from the mobile web server 18. The web browser 4 generates a hash using, amongst other things, the received nonce. The hash is generated by encrypting an information set, hereinafter referred to as the "first information set", with the encryption algorithm contained in the received nonce, and using the earlier received password as a key. The first information set comprises the following: the username, the nonce value, and the first statement of origin. At step s18, the hash and the unencrypted username are sent from the web browser 4 to the mobile web server 18.

The hash and the unencrypted username are passed from the mobile web server 18 to the security module 20. The security module 20 decrypts the hash using the password to extract the first information set, i.e. the username, the nonce value, and the first statement of origin. The security module 20 compares the username extracted from the hash and the received unencrypted username. In this example the extracted username and the unencrypted username are the same, and consequently, the security module 20 generates an authenticated token. The authenticated token comprises an expiration time, i.e. a time at some point in the future after which the authenticated token will become invalid. The security module 20 retains a copy of the authenticated token and passes the authenticated token to the mobile web server 18. At step s20, the mobile web server 18 sends the authenticated token to the web browser 4.

The above described steps s14, s16, s18, and s20 implement a digest authentication process. Digest authentication is fully described in RFC 2617: HTTP Authentication: Basic and Digest Access Authentication, incorporated herein by reference.

The web browser 4 receives the authenticated token and therefore determines that the above mentioned (at step s8) login request issued by the trusted client side script 8 to the browser helper object 10 has been satisfied, and that accordingly the web browser 4 is successfully logged in to the smartphone 16. Thus, at step 21, the browser helper object 10 of the web browser 4 implements a login response comprising informing the trusted client side script 8 of the successful login.

At step s22, a certificate generation process, hereinafter referred to as the "first certificate generation process", is performed by the web browser 4. The first certificate generation process generates an encrypted certificate, hereinafter referred to as the "first certificate". The first certificate comprises an information set, hereinafter referred to as the "second information set". The second information set comprises the following: the first statement of origin, a service instruction, hereinafter referred to as the "first service instruction", to perform a specific service process that the trusted client side script 8 requires the service module 22 of the smartphone 16 to perform, and a sequence number, hereinafter referred to as the "first sequence number". The certificate generation process is described in more detail later below with reference to FIG. 3.

At step s24, the authenticated token and the first certificate are sent from the web browser 4 to the mobile web server 18.

At step 26, the mobile web server performs a validation and service process. The validation and service process results in the mobile web server 18 obtaining or deriving a service product, e.g. user contact details. The service product is the product resulting from the service module 22 of the smartphone 16 performing the first instructed service. The validation and service process is described in more detail later below with reference to FIG. 4.

At step s28, the mobile web server 18 passes the service product to the web browser 4 for use by the trusted client side script 8 which originally requested this service product.

Figure 3:
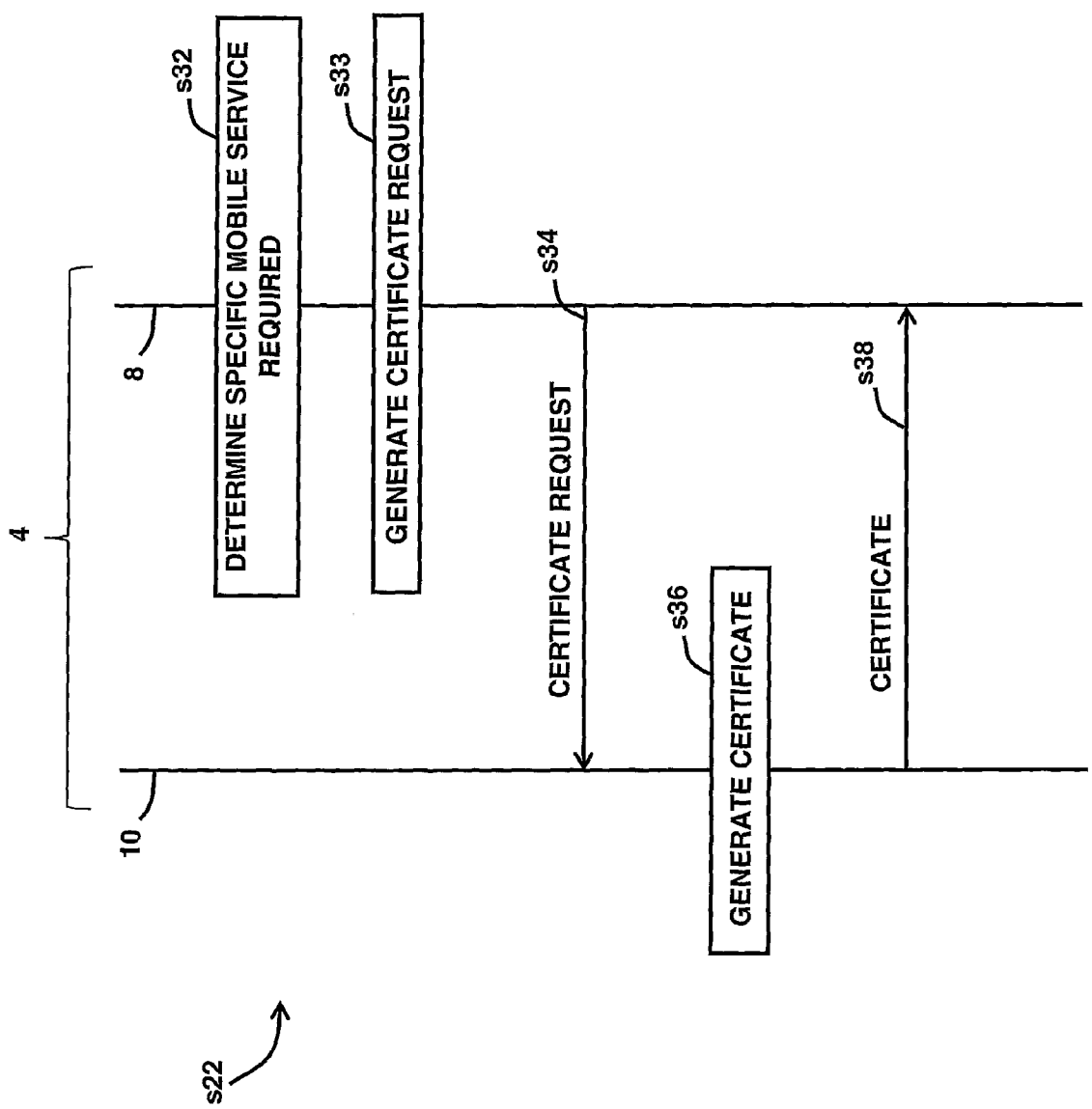
FIG. 3 is a hybrid message sequence chart and process flowchart showing certain messages and steps involved in a first certificate generation process step of the example of an authentication process.

FIG. 3 is a hybrid message sequence chart and process flowchart showing certain messages and steps involved in the first certificate generation process step s22 of the above described example of an authentication process. The following functional parts of the web browser 4 are shown: the browser helper object 10 and the trusted client side script 8.

At step s32, it is determined during the running of the trusted client side script 8 on the web browser 4 that the trusted client side script 8 requires that the first instructed service be performed by the service module 22 of the smartphone 16.

As a result, at step s33 the trusted client side script 8 generates a certificate request. The certificate request comprises the first service instruction, and a request that a certificate be generated.

At step s34, the trusted client side script 8 sends the certificate request message to the web browser helper object 10.

At step s36, in response to the request, the browser helper object 10 generates the first certificate. The first certificate is generated by encrypting the second information set with a standard encryption algorithm, and using the password as a key. In this example, after the generation of the first certificate, the first sequence number is incremented by one. The use and incrementation of the sequence number is for the purpose of attempting to stop replay attacks. This use is preferable but optional, as the example will still provide advantages even when implemented without the use of this sequence number.

At step s38, the browser helper object 10 sends the certificate to the trusted client side script 8, thereby completing step s22.

Figure 4:
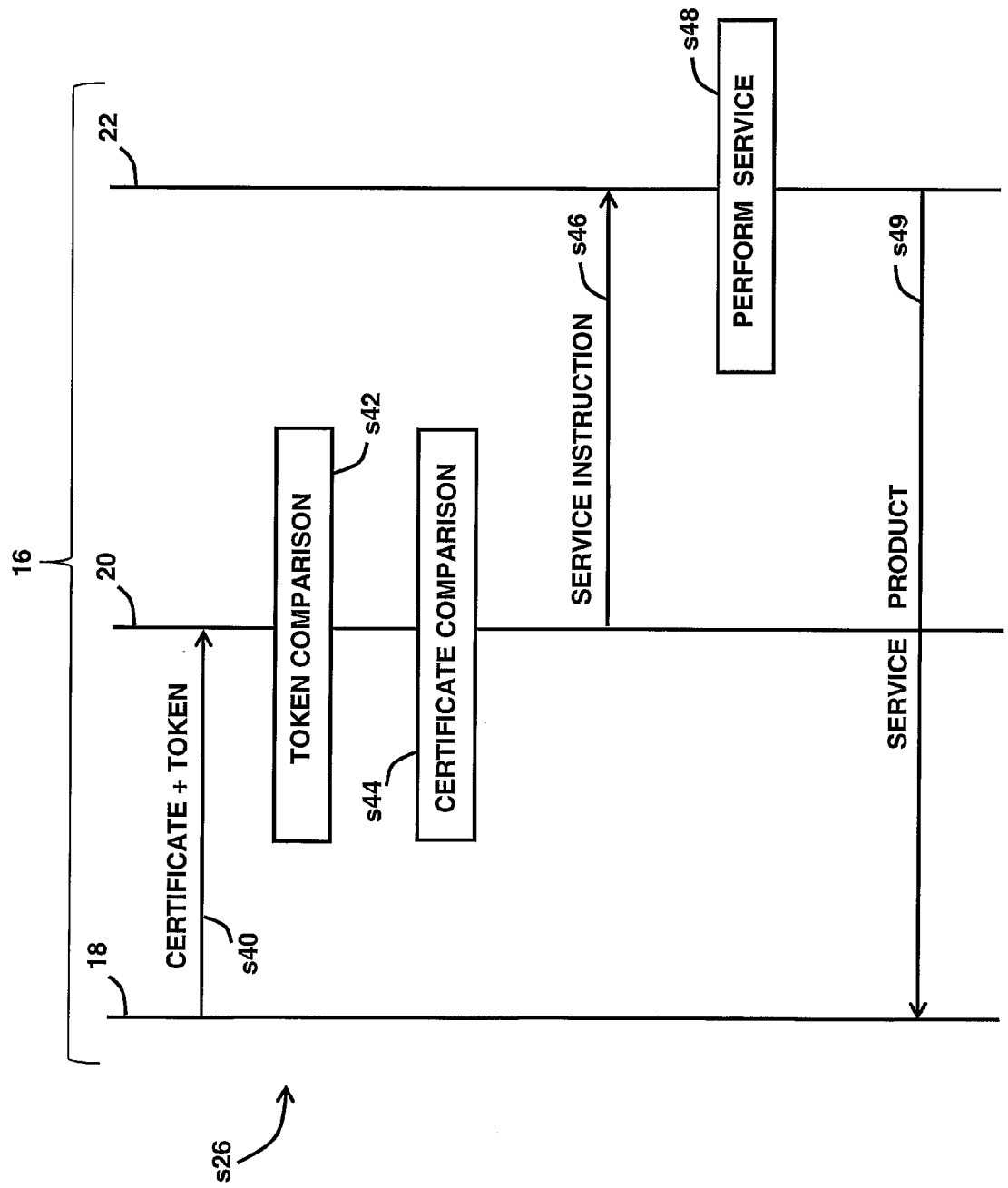
FIG. 4 is a hybrid message sequence chart and process flowchart showing certain messages and steps involved in a validation and service process step of the example of an authentication process.

FIG. 4 is a hybrid message sequence chart and process flowchart showing certain messages and steps involved in the validation and service process step s26 of the above described example of an authentication process. The following functional parts of the smartphone 16 are shown: the mobile web server 18, the security module 20, and the service module 22.

At step s40, the mobile web server 18 passes the authenticated token and the first certificate to the security module 20.

At step s42 the security module 20 compares the received authenticated token to the retained authenticated token. Also, the security module 20 checks the expiration time of the authenticated token to ensure that the authenticated token is still valid.

The security module 20 decrypts the first certificate using the password in order to extract the second information set contained within the first certificate. At step 44, the security module 20 compares the first statement of origin extracted from the first certificate to the first statement of origin retained by the security module 20 as part of the retained nonce request.

In order for the security module 20 to verify the communication it receives (and therefore pass on the service instruction to the service module 22) the authenticated tokens compared at step s42 need to correspond to each other, and the statements of origin compared at step s44 need to correspond to each other. If the compared authenticated tokens do not correspond to each other, and/or the compared statements of origin do not correspond to each other, the security module 20 will deny the associated service instruction.

In this example the received authenticated token and the retained authenticated tokens correspond to each other. Also, in this example, the first statement of origin extracted from the first certificate and the first statement of origin retained by the security module 20 correspond to each other. Thus, the security module 20 determines that the first service request is to be allowed. Consequently, at step s46, the security module 20 passes the first service instruction, which was extracted from the first certificate as described above, to the service module 22.

At step s48, the service module 22 performs the first instructed service. The performance of the first instructed service by the service module 22 results in the service process product.

At step s49, the service module 22 passes the service process product to the mobile web server 18, thereby completing step s26.

The above described example describes a process in which the first service instruction is allowed to be performed by the service module 22 of the smartphone 16. In contrast, an example of a process in which a service instruction is prevented from being performed, i.e. is denied or rejected, will now be described, with reference to FIGS. 5 and 6.

Figure 5:
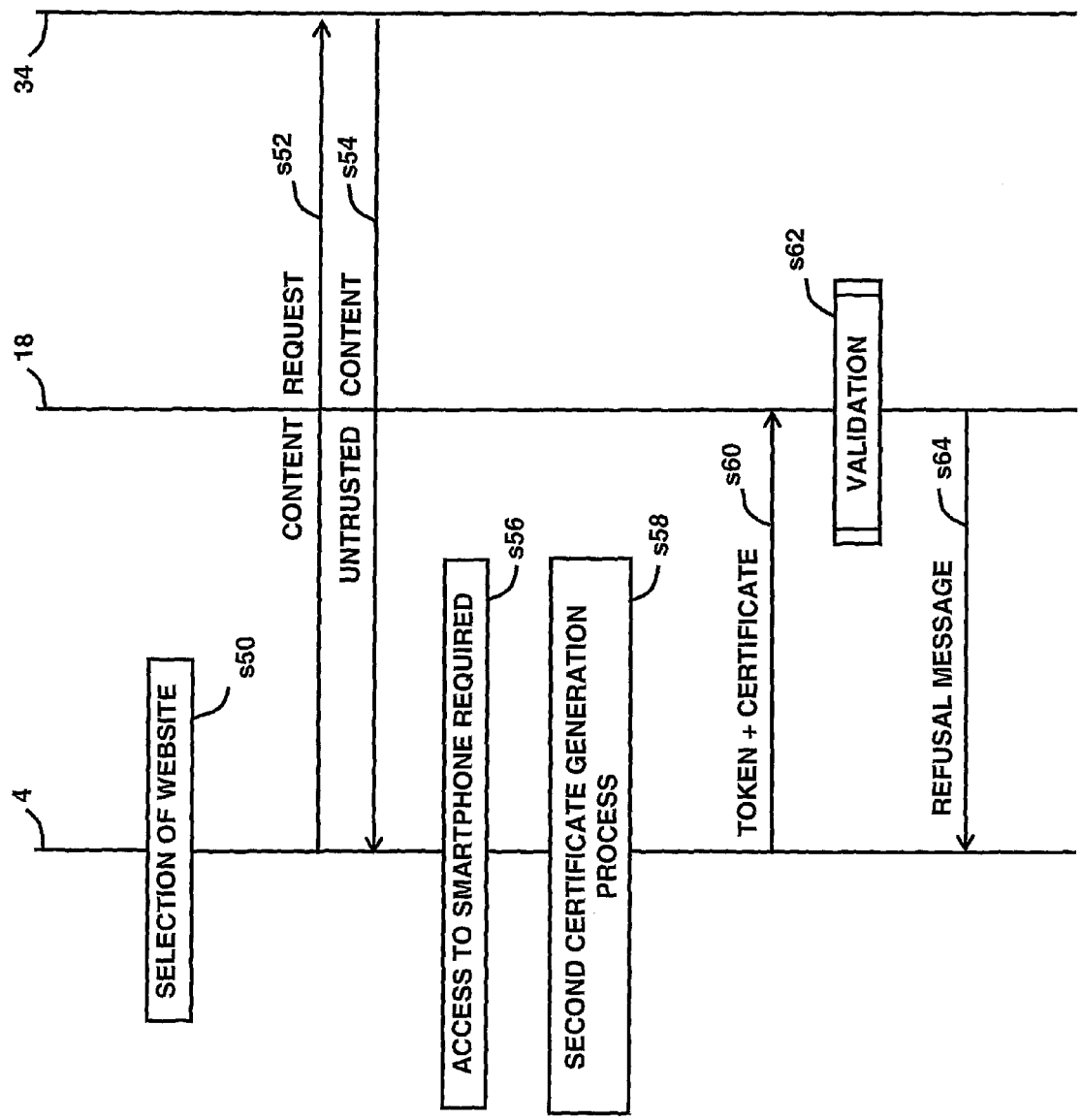
FIG. 5 is a hybrid message sequence chart and process flowchart showing certain messages and steps involved in a process leading to denial or rejection of a service during operation of the communication network.

FIG. 5 is a hybrid message sequence chart and process flowchart showing certain messages and steps involved in a process leading to denial or rejection of a service during operation of the communication network 1, due to "untrusted content" being downloaded from the untrusted web server 34. The content that is downloaded from the untrusted server 34 is referred to here as untrusted content because the server the content is received from is not trusted by the user 12, as described above. The following entities are shown: the web browser 4, the mobile web server 18 and the untrusted web server 34.

In this example, a second precondition has been fulfilled by the above entities before the start of the process. The second precondition is that the user 12 is registered to use the smartphone 16, i.e. that the first precondition holds, and that the user 12 has carried out steps s2 to s21 described above with reference to FIG. 2.

At step s50, the web browser 4 selects a second website, the second website being a website hosted by the untrusted web server 34.

At step s52, the web browser 4 sends a content request, hereinafter referred to as the "second content request", to the untrusted web server 34. The second content request is in the form of an HTTP request specifying the second website.

At step s54, the untrusted web server 34 sends a response, hereinafter referred to as the "second response", to the web browser 4. The second response comprises the previously described untrusted content. The untrusted content is an HTTP in the form of a HTML document corresponding to the selected second website.

At step s56, the web browser 4 determines that access to the smartphone 16 will be required. This is carried out as follows.

The web browser 4 processes the second response by running the untrusted content. The untrusted content comprises untrusted client side script. Thus, the untrusted client side script is run by the web browser 4. This client side script is referred to here as untrusted client side script because the content that comprises this client side script is received from a server that is not trusted by the user 12, as described above. In this embodiment the untrusted client side script is JavaScript (trademark). The untrusted client side script comprises code that code that calls on services offered by the service module 22 of the smartphone 16.

The untrusted client side script requires that a service request, hereinafter referred to as the "second service request", be issued by the web browser 4 to the smartphone 16. The second service request requests the performance of a service process by the service module 22 of the smartphone 16.

At step s58, a certificate generation process, hereinafter referred to as the "second certificate generation process" is performed by the web browser 4. The second certificate generation process generates a certificate, hereinafter referred to as the "second certificate". The second certificate comprises an information set, hereinafter referred to as the "third information set". The third information set comprises the following: a statement of origin, hereinafter referred to as the "second statement of origin", i.e. a statement that the origin of the untrusted client side script is the untrusted web server 34; a service instruction, hereinafter referred to as the "second service instruction", to perform a specific service process that the untrusted client side script requires the service module 22 of the smartphone 16 to perform; and a sequence number, hereinafter referred to as the "second sequence number". The second certificate generation process is the same as the first certificate generation process as described in more detail above with reference to FIG. 3, except that the trusted client side script 8 is replaced by the untrusted client side script, the first service instruction is replaced by the second service instruction, and the first certificate is replaced by the second certificate.

At step s60, the web browser 4 passes the authenticated token (obtained as part of satisfying the second precondition) and the second certificate, to the mobile web server 18.

At step 62, the mobile web server performs a validation process. The validation process results in the mobile web server 18 obtaining or deriving a refusal message. The refusal message comprises a statement that the second service request has been refused. The validation process is described in more detail later below with reference to FIG. 6.

At step s64, the mobile web server 18 passes the refusal message to the web browser 4.

Figure 6:
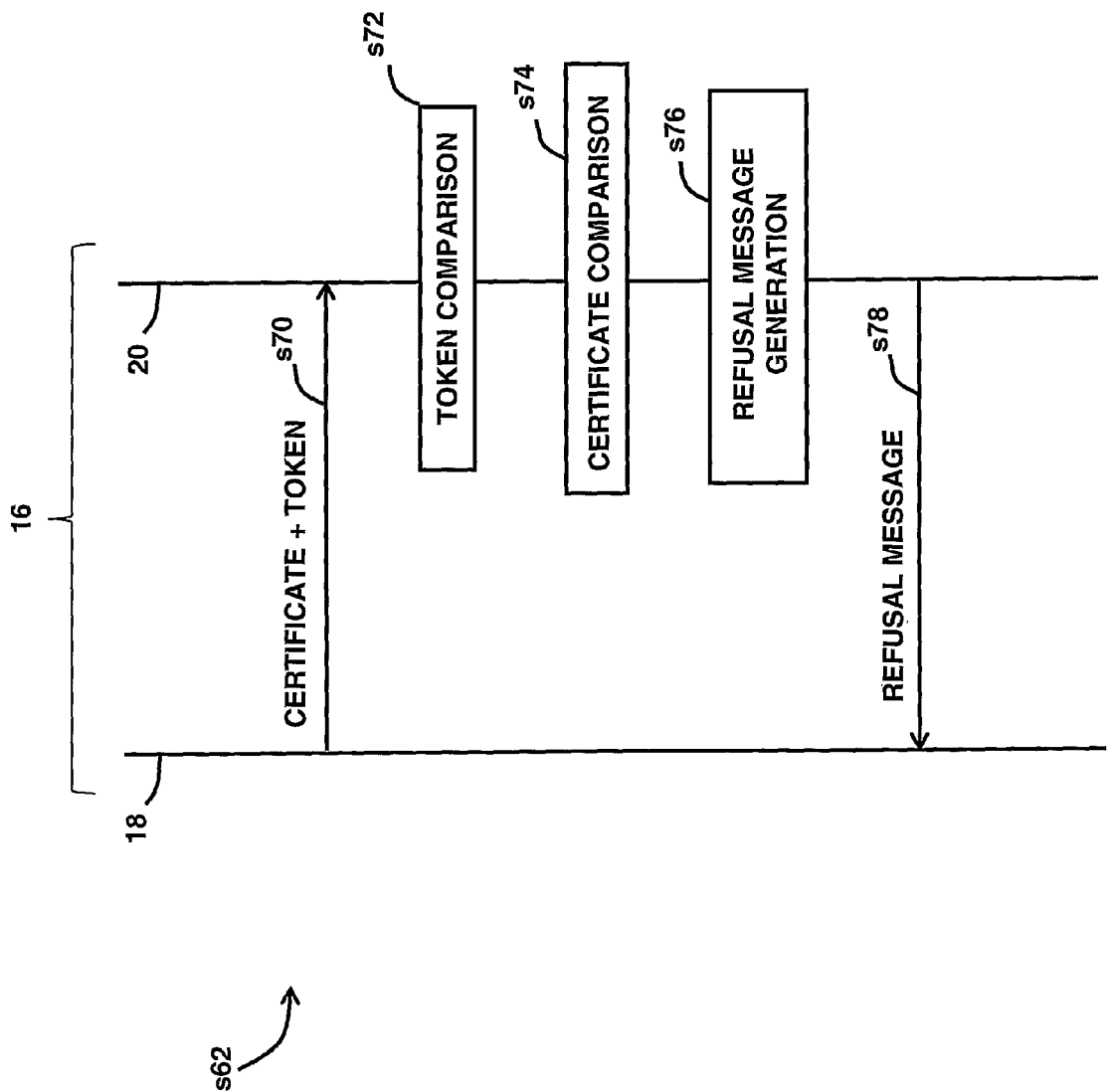
FIG. 6 is a hybrid message sequence chart and process flowchart showing certain messages and steps involved in a validation process step of the process leading to rejection of a service during operation of the communication network.

FIG. 6 is a hybrid message sequence chart and process flowchart showing certain messages and steps involved in the validation process step s62 of the above described process leading to rejection of a service during operation of the communication network 1. The following functional parts of the smartphone 16 are shown: the mobile web server 18, and the security module 20.

At step s70, the mobile web server 18 passes the authenticated token and the second certificate to the security module 20.

At step s72, the security module 20 compares the received authenticated token to the retained authenticated token. Also, the security module 20 checks the expiration time of the authenticated token to ensure that the authenticated token is still valid.

The security module 20 decrypts the second certificate using the password in order to extract the third information set contained within the second certificate. At step 74, the security module 20 compares the second statement of origin extracted from the second certificate to the first statement of origin retained by the security module 20 as part of the retained nonce request.

In order for the security module 20 to verify the communication it receives (and therefore pass on the service instruction to the service module 22) the authenticated tokens compared at step s72 need to correspond to each other, and the statements of origin compared at step s74 need to correspond to each other. If the compared authenticated tokens do not correspond to each other, and/or the compared statements of origin do not correspond to each other, the security module 20 will deny the associated service instruction.

In this example the received authenticated token and the retained authenticated tokens correspond to each other. However, in this example, the second statement of origin extracted from the second certificate and the first statement of origin retained by the security module 20 do not correspond to each other, i.e. the first statement of origin discloses trusted web server 30 as the origin, whereas the second statement of origin discloses the untrusted web server 34 as the origin. Thus, the security module 20 determines that the second service request is to be denied. Consequently, the security module 20 generates the refusal message mentioned earlier with regard to step s62.

At step s78, the security module 20 passes the refusal message to the mobile web server 18, thereby completing step s62.

Thus, the above described processes tend to reduce security risks arising from cross-site scripting. In particular, the above described processes provide that the smartphone 16 will only fulfil service requests received from the PC 2 from script that has been verified as being from an original trusted source that the user 12 has approved whilst operating the PC 2 (by logging in from the PC 2). Thus, the smartphone 16 is protected (when the user is using the PC 2 and this leads to a service being required from the smartphone 16) by the user's approval of the trusted source without the user 12 needing to interact directly with the smartphone 16, for example.

A first embodiment of a process of direct user authorisation will now be described with reference to FIGS. 7 to 9. In this embodiment a process of direct user authorisation is incorporated into the above described example of a cross-site scripting authorisation process. It will however be appreciated that in isolation the steps newly described below provide a further embodiment of a process of direct user authorisation. In other words, embodiments of a process of direct user authorisation may be provided without including the above described steps providing the above described example of a cross-site scripting authorisation process. Thus, for example, in further embodiments the direct user authorisation steps may be performed after other types of cross-site scripting authorisation processes, and/or other general or specific authorisation and/or log-in processes, instead of or in addition to the ones included in the following embodiment.

Figure 7:
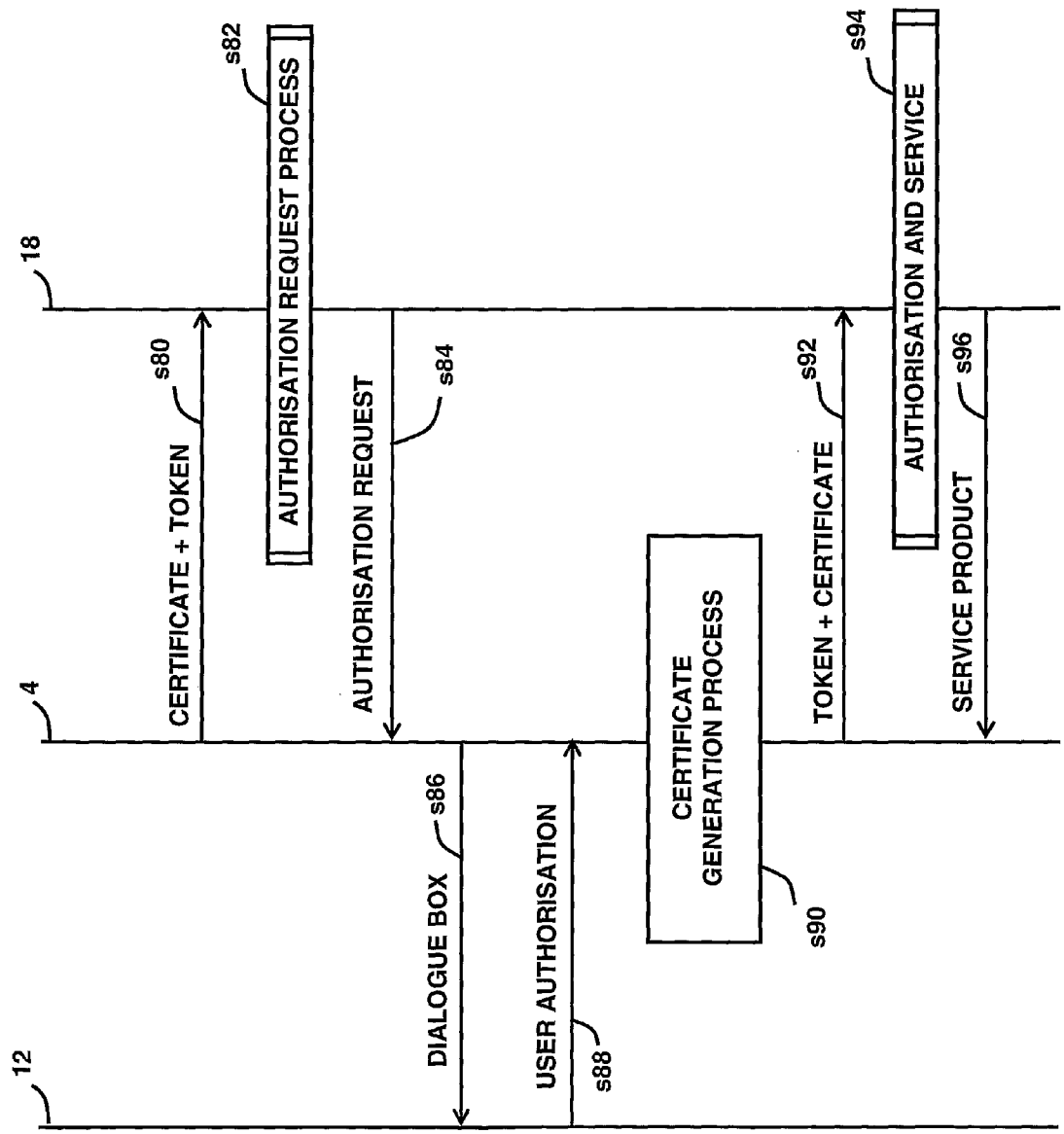
FIG. 7 is a process flowchart showing certain messages and steps involved in an embodiment of a direct user authorisation process.

FIG. 7 is a process flowchart showing certain messages and steps involved in a first embodiment of a direct user authorisation process. The following entities are shown: the user 12, the web browser 4 and the mobile web server 18.

Part of this process is that of the above mentioned entities fulfilling a third precondition. The third precondition is that the user 12 is registered to use the smartphone 16, i.e. that the first precondition holds, and that the user 12 has carried out steps s2 to s22 described above with reference to FIG. 2.

At step s80, the web browser 4 sends the authenticated token and the first certificate to the mobile web server 18.

At step s82, an authorisation request process is performed by the mobile web server 18. The authorisation request process generates an authorisation request. The authorisation request is a message comprising a statement that user authorisation is required in order for the first service instruction, requested by the trusted client side script 8, to be performed by the service module 22 of the smartphone 16. The authorisation request process is described in more detail later below with reference to FIG. 8.

At step s84, mobile web server 18 passes the authorisation request to the web browser 4.

The web browser processes the authorisation request. The authorisation request informs the trusted client side script 8, running on the web browser 4, that user authorisation is required in order for the first service instruction to be performed. Consequently, the trusted client side script 8 passes the authorisation request to the browser helper object 10.

At step s86, the authorisation request is communicated to the user 12. In this example, the authorisation request is communicated to the user 12 by means of a dialogue box displayed by the PC 2. This dialogue box displays the identity of the smartphone 16, the origin of the trusted client side script 8 (i.e. the trusted web server 30), and the service being requested by the trusted client side script 8, to be performed by the service module 22. This dialogue box requires that the user 12 select an 'OK' button present in the dialogue box if the user wishes to give authorisation.

At step s88, the user 12 selects the 'OK' button present in the dialogue box and this is input into the web browser 4.

At step s90, an authorisation certificate generation process is performed by the web browser 4. The authorisation certificate generation process is performed as follows. In response to the user 12 selecting the 'OK' button present in the dialogue box, the browser helper object 10 generates a certificate, hereinafter referred to as the "authorisation certificate". The authorisation certificate is generated by encrypting an information set, hereinafter referred to as the "fourth information set", with a standard encryption algorithm, and using the password as a key. The fourth information set comprises the first statement of origin, the first service instruction, a so-called user signature (i.e. a statement that the first service instruction has been authorised by the user 12), and, a sequence number, hereinafter referred to as the "third sequence number". In this example, after the generation of the authorisation certificate, the third sequence number is incremented by one. The use and incrementation of the sequence number is for the purpose of attempting to stop replay attacks. This use is preferable but optional, as the embodiment will still provide advantages even when implemented without the use of this sequence number. It will also be appreciated that the items such as the first statement of origin are not essential, and are only included as this embodiment is being described in the context of being advantageously incorporated into the earlier described example of a cross-site scripting authorisation process. The browser helper object 10 passes the authorisation certificate to the trusted client side script 8.

At step s92, the web browser 4 passes the authorisation certificate and the authenticated token to the mobile web server 18.

At step 94, the mobile web server 18 performs an authorisation and service process. The authorisation and service process results in the mobile web server 18 obtaining or deriving a service product, hereinafter referred to as the "authorised service product". The authorised service product is the product resulting from the service module 22 of the smartphone 16 performing the first instructed service following user authorisation. The authorisation and service process is described in more detail later below with reference to FIG. 9.

At step s96, the mobile web server 18 passes the authorised service product to the web browser 4 for use by the trusted client side script 8 which originally requested this service product.

Figure 8:
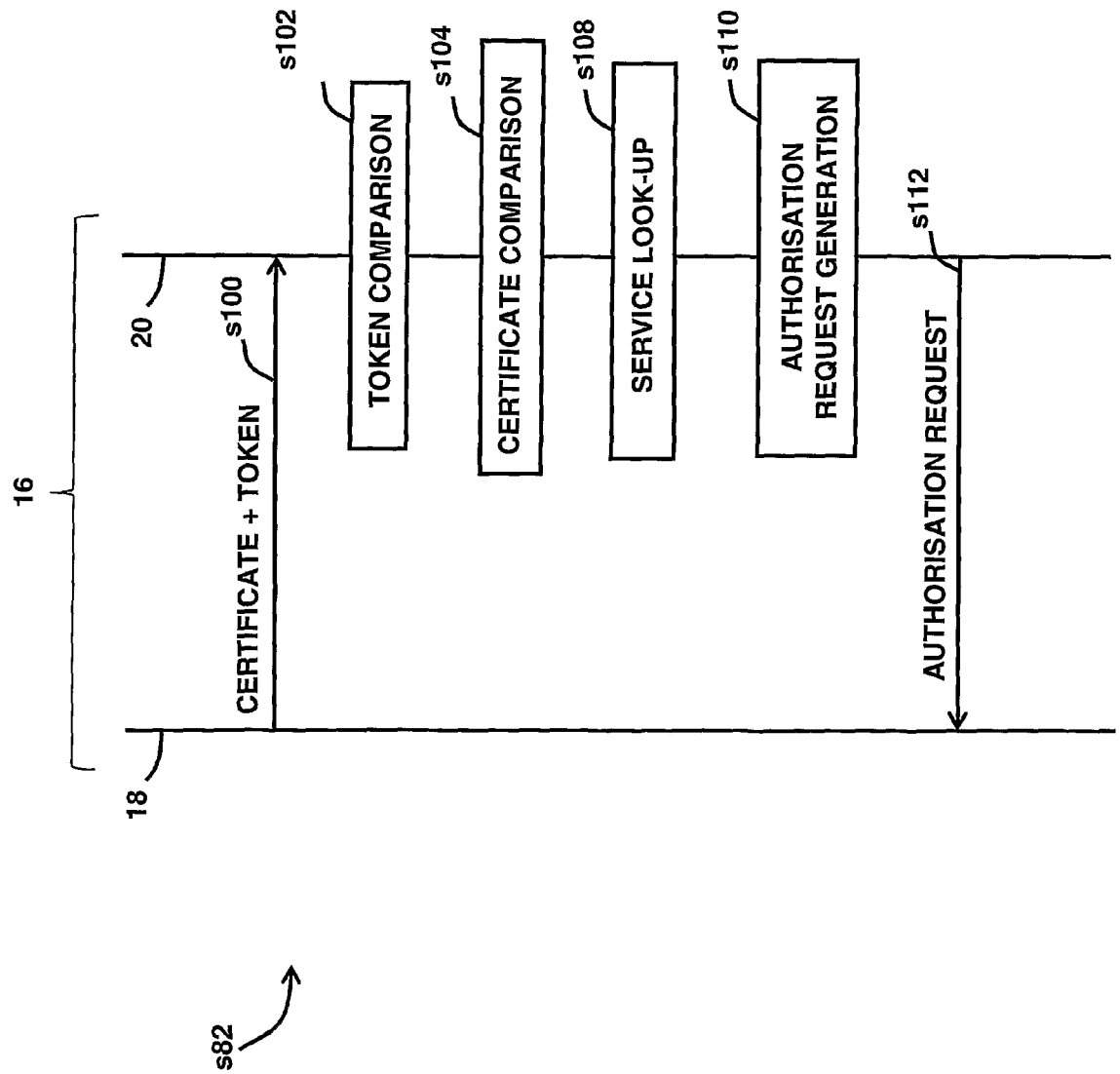
FIG. 8 is a hybrid message sequence chart and process flowchart showing certain messages and steps involved in an authorisation request process step of the embodiment of a direct user authorisation process described with reference to FIG. 7.

FIG. 8 is a hybrid message sequence chart and process flowchart showing certain messages and steps involved in the authorisation request process step s82 of the above described embodiment of a direct user authorisation process. The following functional parts of the smartphone 16 are shown: the mobile web server 18, and the security module 20.

At step s100, the mobile web server 18 passes the authenticated token and the first certificate to the security module 20.

At step s102 the security module 20 compares the received authenticated token to the retained authenticated token. Also, the security module 20 checks the expiration time of the authenticated token to ensure that the authenticated token is still valid.

The security module 20 decrypts the first certificate using the password in order to extract the second information set contained within the first certificate. At step 104, the security module 20 compares the first statement of origin extracted from the first certificate to the first statement of origin retained by the security module 20 as part of the retained nonce request.

In order for the security module 20 to verify the communication it receives (and therefore pass on the service instruction to the service module 22) the authenticated tokens compared at step s102 need to correspond to each other, and the statements of origin compared at step s104 need to correspond to each other. If the compared authenticated tokens do not correspond to each other, and/or the compared statements of origin do not correspond to each other, the security module 20 will deny the associated service instruction.

In this example the received authenticated token and the retained authenticated tokens correspond to each other. Also, in this example, the first statement of origin extracted from the first certificate and the first statement of origin retained by the security module 20 correspond to each other. Thus, the security module 20 determines that the first service request is to be allowed.

At step s108, the security module 20 compares the specific service referred to in the first service instruction to a list of services for which direct user authorisation is required, e.g. services for which the user 12 would be charged, e.g. sending an SMS message from the smartphone 16. Note that in this example, there are some services offered by the service module 22 that require direct user authorisation, and other services offered by the service module 22 that do not require direct user authorisation (i.e. the security module 20 discriminates between services that require direct user authorisation and services that do not requires direct user authorisation).

In this example, the specific service referred to in the first service instruction matches or corresponds to one of the services on the list of services for which user authorisation is required. Consequently, at step s110, the security module 20 generates the authorisation request.

At step s112, the security module 20 passes the authorisation request to the mobile web server 18, thereby completing step s82.

Figure 9:
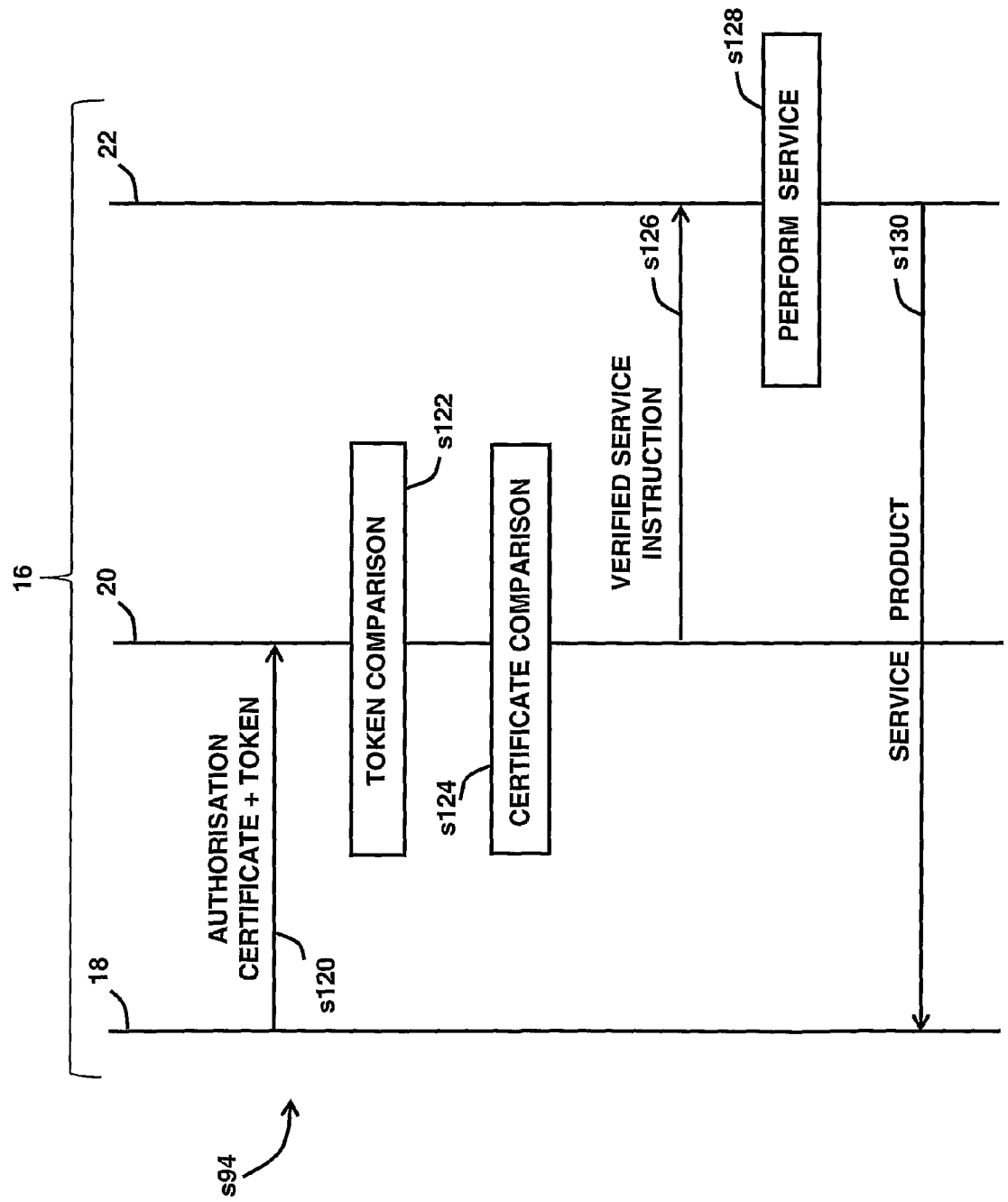
FIG. 9 is a hybrid message sequence chart and process flowchart showing certain messages and steps involved in an authorisation and service process step of the embodiment of a direct user authorisation process described with reference to FIG. 7.

FIG. 9 is a hybrid message sequence chart and process flowchart showing certain messages and steps involved in the authorisation and service process step s94 of the above described embodiment of a direct user authorisation process. The following functional parts of the smartphone 16 are shown: the mobile web server 18, the security module 20, and the service module 22.

At step s120, the mobile web server 18 passes the authenticated token and the authorisation certificate to the security module 20.

At step s122 the security module 20 compares the received authenticated token to the retained authenticated token. Also, the security module 20 checks the expiration time of the authenticated token to ensure that the authenticated token is still valid.

The security module 20 decrypts the authorisation certificate using the password in order to extract the fourth information set contained within the authorisation certificate. At step 124, the security module 20 compares the first statement of origin extracted from the authorisation certificate to the first statement of origin retained by the security module 20 as part of the retained nonce request.

In order for the security module 20 to verify the communication it receives (and therefore pass on the service instruction to the service module 22) the authenticated tokens compared at step s122 need to correspond to each other, and the statements of origin compared at step s124 need to correspond to each other. If the compared authenticated tokens do not correspond to each other, and/or the compared statements of origin do not correspond to each other, the security module 20 will deny the associated service instruction.

In this example the received authenticated token and the retained authenticated tokens correspond to each other. Also, in this example, the first statement of origin extracted from the authorisation certificate and the first statement of origin retained by the security module 20 correspond to each other. Thus, the security module 20 determines that the first service instruction is to be allowed. Also, the security module 20 determines from the user signature, extracted from the authorisation certificate, that the first service instruction has been verified by the user 12. Consequently, the security module 20 generates a "verified service instruction", comprising the first service instruction. Then, at step s126, the security module 20 sends a "verified service instruction message", comprising the verified service instruction, to the service module 22. The service module 22 receives the verified service instruction message.

At step s128, the service module 22 performs the first instructed service. The performance of the first instructed service by the service module 22 results in the authorised service product.

At step s130, the service module 22 passes the authorised service product to the mobile web server 18, thereby completing step s94.

The above described embodiment tends to reduce security risks arising from cross-site scripting. In particular, risks from code maliciously inserted by an untrusted source into script that is being trusted due to its primary source tend to be reduced.

In the above embodiments a request that a service be performed is sent by a PC, and a smartphone carries out the requested service. However, in other embodiments a different type of device sends the request that a service be performed. Further, in other embodiments a different type of device carries out the requested services. In either or both cases, said different type of device may be one or more of the following: a PC, a smartphone, a different type of mobile device, an IP router or a network storage device.

In the above embodiments the PC and the smartphone are connected via a Wi-Fi link. However, in other embodiments other types of link are used, for example a USB cable or a Bluetooth connection In the above embodiments the PC is connected to the trusted and untrusted servers via the Internet. However, in other embodiments the PC is connected to the trusted and untrusted servers via different means, for example a LAN network.

In the above embodiments the PC is connected to a single trusted server. However, in other embodiments the PC is connected to a plurality of trusted servers.

In the above embodiments the PC is connected to a single untrusted server. However, in other embodiments the PC is connected to a plurality of untrusted servers.

In the above embodiments an authentication process is implemented using a browser helper object (BHO) 10 running as a web browser plug-in application in a web browser 4 comprises. However, in other embodiments the authentication process is implemented using a different set-up, for example a different web browser plug-in is used, or the functionality provided by the browser helper object is provided by the web browser itself.

In the above embodiments the trusted client side script 8 is Javascript (trademark). However, in other embodiments the trusted client side script is in a different appropriate format, for example VBScript (trademark), or ActionScript (trademark).

In the above embodiments the untrusted client side script is Javascript (trademark). However, in other embodiments the untrusted client side script is in a different appropriate format, for example VBScript (trademark), or ActionScript (trademark).

In the above embodiments the user interface 24 comprises a display screen and a standard smartphone key-pad. However, in other embodiments the user interface comprises a different appropriate arrangement.

In the above embodiments the smartphone 16 comprises the following functional modules: a mobile web server 18, a security module 20, a service module 22, and a user interface 24. However, in other embodiments the smartphone comprises different appropriate functional modules, for example in another embodiment the smartphone comprises a mobile web server that itself provides the functionality of the functional modules described above.

In the above embodiments HTTP is used. However, in other embodiments other web protocols are used.

In the above embodiments the service module 22 performs the service of providing information on the user's contacts. However, in other embodiments the service module performs at least one different service, such as providing access to smartphone held content, for example: contact information, call log information, SMS messages, or location information (e.g. GPS information, cell information, Wi-Fi access point information), and/or the initiation of actions such as initiating calls or making SMS calls.

In the above embodiments, token comparison processes (steps s42, s72, s102 and s122) are followed by certificate comparison processes (steps s44, 74, 104, and s124). However, in other embodiments one or more of the certificate comparison processes is carried out before the corresponding token comparison process. Further, in other embodiments one or more of the token comparison processes and the corresponding certificate comparison process are carried out concurrently.

In the above embodiments a certificate comprises a statement of origin for a service request. However, in other embodiments the certificate comprises different information identifying the origin of service request, or no statement of origin is included.

In the above embodiments, at step s86, the user 12 is required to select an 'OK' button present in a dialogue box should they wish to authorise the. However, in other embodiments a different means of confirming user authorisation is used, for example requesting the username and password.

In the above embodiments, at step s86, the dialogue box displays the identity of the smartphone 16, the origin of the trusted client side script 8, and the service being requested by the trusted client side script 8. However, in other embodiments, at step s86, the dialogue box displays different information.

In the above embodiments a service product is sent from the service module 22 of the smartphone 16 to the web browser 4 (for example via message steps s96 and s130). However, in other embodiments a service product is not sent from the service module 22 of the smartphone 16 to the web browser 4. For example in an embodiment in which the requested service is that the smartphone 16 makes a call, no service product as such is generated. Further, in other embodiments a message confirming that a service has been performed is sent from the service module 22 to the web browser 4 in addition to, or instead of, a service product.

In the above embodiments, at step s108, the security module 20 compares the specific service referred to in the first service instruction to a list of services for which direct user authorisation is required, e.g. services for which the user 12 would be charged, e.g. sending an SMS message from the smartphone 16. However, in other embodiments the security module 20 compares the specific service to a different set of services that have been specified in a different manner, for example a set of services previously specified by the user.

In the above embodiments, at step s108 there are some services offered by the service module 22 that require direct user authorisation, and other services offered by the service module 22 that do not require direct user authorisation. However, in other embodiments all services require user authorisation.

What is claimed is:

1. A first communications device comprising:
a processor and a tangible storage medium on which are stored program instructions which are executable by the processor to at least:
   (a) implement a scripting engine for running a received client side script; and
   (b) cause the first communications device to:
      (i) respond to input from a human user to send a content request to a remote source,
      (ii) respond to receipt from the remote source of the requested content by running, by the scripting engine, a client side script that the remote source has embedded within the requested content,
      (iii) respond to a requirement of the client side script for a service provided by a second communications device by sending to the second communications device a service request for the required service,
      (iv) respond to receipt from the second communications device of a request for direct user authorization for the provision of the required service by communicating the request for direct user authorization to the human user, and
      (v) respond to input from the human user providing that authorization by sending to the second communications device an indication that the human user provided the requested user authorization; and
   the first communications device being configured to conceal details of the authorization from the client side script being run by the scripting engine in the first communication device,
   wherein the details of the authorization are concealed from the client side script by encrypting the authorization with a password known to the first communications device but which is neither known, nor accessible, to the client side script.

2. A first communications device according to claim 1, wherein the first communications device is configured to respond to receipt from the second communications device of a service product resulting from the provision of the required service by providing the received service product to the client side script.

3. A method performed by a first communications device, the method comprising:
   implementing a scripting engine for running a received client side script;
   responding to input from a human user to send a content request to a remote source;
   responding to receipt from the remote source of the requested content by running, by the scripting engine, a client side script that the remote source has embedded within the requested content;
   responding to a requirement of the client side script for a service provided by a second communications device by sending to the second communications device a service request for the required service;
   responding to receipt from the second communications device of a request for direct user authorization for the provision of the required service by communicating the request for direct user authorization to the human user;
   responding to input from the human user providing that authorization by sending to the second communications device an indication that the human user provided the requested user authorization; and
   concealing details of the authorization from the client side script being run by the scripting engine in the first communication device,
   wherein the details of the authorization are concealed from the script by encrypting the authorization with a password known to the first communications device but which is neither known, nor accessible, to the client side script.

4. A method according to claim 3, wherein the first communications device responds to receipt from the second communications device of a service product resulting from the provision of the required service by providing the received service product to the client side script.

5. A system comprising a first communications device and a second communications device,
   the first communications device comprising:
   a first processor and a first non-transitory storage medium on which are stored program instructions which are executable by the first processor to at least:
      (a) implement a scripting engine for running a received client side script; and
      (b) cause the first communications device to:
         (i) respond to input from a human user to send a content request to a remote source,
         (ii) respond to receipt from the remote source of the requested content by running, by the scripting engine, a client side script that the remote source has embedded within the requested content,
         (iii) respond to a requirement of the client side script for a service provided by the second communications device by sending to the second communications device a service request for the required service,
         (iv) respond to receipt from the second communications device of a request for direct user authorization for the provision of the required service by communicating the request for direct user authorization to the human user, and
         (v) respond to input from the human user providing that authorization by sending to the second communications device an indication that the human user provided the requested user authorization; and
   the first communications device being configured to conceal details of the authorization from the client side script being run by the scripting engine in the first communication device; and
   the second communications device comprising:
      a second processor and a second non-transitory storage medium on which are stored program instructions which are executable by the second processor of the second communications device to at least:
      cause the second communications device to perform the service requested from the first communications device, only after receiving an authorization indicative of the fact that a human user of the first communications device had directly provided an indication at a user interface of the first communications device that that service was authorized to be performed;
   wherein the details of the authorization are concealed from the script by encrypting the authorization with a password known to the first communications device but which is neither known, nor accessible, to the client side script.

6. A system according to claim 5 wherein the second communications device is configured to forward to the first communications device a service product resulting from performance of the requested service, and the first communication device is configured to respond to receipt of the service product by providing the received service product to the client side script.

7. A system according to claim 5, wherein the service request and the authorization are received by a web server running in the second communications device.

* * * * *